3,250,751
HOMOGENEOUS POLYMERIZATION PROCESS
William T. Brady, Hugh J. Hagemeyer, Jr., and Alfred G. Robinson, Longview, Tex., assignors to Eastman Kodak Company, Rochester, N.Y., a corporation of New Jersey
No Drawing. Filed Aug. 20, 1962, Ser. No. 218,144
9 Claims. (Cl. 260—78.5)

This invention relates to a process for the preparation of 1,1,4,4-tetraalkyl-1,3-butadiene maleic anhydride copolymers exhibiting excellent physical properties. More particularly, this invention relates to a process for the preparation of 1,1,4,4-tetraalkyl-1,3-butadiene maleic anhydride copolymers in good yield under relatively mild reaction conditions. In a specific aspect, this invention involves copolymerizing 1,1,4,4-tetramethyl-1,3-butadiene with maleic anhydride at relatively mild reaction conditions in a homogeneous system using an inert organic liquid solvent such as dimethyl formamide.

It is known that 1,1,4,4-tetraalkyl-1,3-butadienes can be polymerized to form polymers exhibiting good physical properties making them useful in a number of applications. For example, 1,1,4,4-tetraalkyl-1,3-butadiene polymers are particularly useful in the preparation of films, fibers and coatings due to their good solubility in a number of solvents, their high melting point, high molecular weight and excellent resistance to corrosive chemicals. Of particular interest are the 1,1,4,4-tetraalkyl-1,3-butadiene maleic anhydride copolymers which can be extruded or molded into useful articles of quite unique properties including dye affinity. In addition, solutions of these copolymers can be used for casting surface coatings which are water resistant. It is evident, therefore, that a novel, direct and economically feasible process for the preparation of 1,1,4,4-tetraalkyl-1,3-butadiene maleic anhydride copolymers will substantially enhance the art.

Accordingly, it is an object of this invention to provide a novel process for the preparation of 1,1,4,4-tetraalkyl-1,3-butadiene maleic anhydride copolymers.

Another object of this invention is to provide a simple, direct and economically feasible process for the preparation of 1,1,4,4-tetraalkyl-1,3-butadiene maleic anhydride copolymers.

Still another object of this invention is to provide a process for the preparation of 1,1,4,4-tetraalkyl-1,3-butadiene maleic anhydride copolymers in a homogeneous reaction mixture which can be easily processed to isolate the copolymers in high yield and purity.

Other objects and advantages of the present invention will become apparent from an examination of the following specification and claims.

In accordance with this invention is has been found that 1,1,4,4-tetraalkyl-1,3-butadiene maleic anhydride copolymers can be readily prepared in a homogeneous system by copolymerizing the monomers at a temperature in the range of about 30 to about 150° C., and preferably about 50 to about 100° C., in the presence of an inert organic liquid which is a solvent for the copolymer at the reaction temperature employed in the polymerization.

An extremely significant feature of this invention is the fact that the polymerization reaction takes place in a completely homogeneous system which greatly simplifies the process and simplifies the work-up of the copolymer. Still another advantage of the inventive process is illustrated by the fact that a heterogeneous process in which a non-solvent such as benzene is employed as a diluent at lower temperatures, for example 0–25° C., in addition to being subject to the processing limitations accompanying a heterogeneous system, will give conversions of only 4–5% at best, and even then only after prolonged reaction periods, for example 6 or 7 days. In contrast, the homogeneous polymerization process described herein achieves conversions as high as 70% and usually in the range of about 34–70% in as little as 6–15 hours.

The 1,1,4,4-tetraalkyl-1,3-butadienes employed in the practice of this invention can be represented by the following formula:

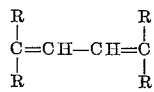

wherein each R is an alkyl radical, desirably a lower alkyl radical and preferably contains 1–4 carbon atoms. These alkyl substituted conjugated dienes can be prepared by any of the conventional prior art methods generally employed for this purpose and include, for example, those compounds in which each R in the above-mentioned formula is an alkyl radical such as methyl, ethyl, propyl, butyl, isobutyl and the like. Specific examples of such compounds include 1,1,4,4-tetramethyl-1,3 - butadiene, 1,1,4,4 - tetraethyl-1,3-butadiene, 1,1,4,4-tetrapropyl-1,3-butadiene and similar tetraalkyl substituted conjugated dienes.

Maleic anhydride is, of course, a readily available starting material for the process of this invention and can be prepared by any of the conventional prior art processes suitable for this purpose. It is significant to note that maleic anhydride appears to be rather unique in its ability to copolymerize with 1,1,4,4-tetraalkyl-1,3-butadienes according to the process of this invention. Thus, other ethylenically unsaturated nonhydrocarbons such as the maleates, methacrylates, acrylates or acrylonitrile fail to copolymerize satisfactorily with 1,1,4,4-tetraalkyl-1,3-butadienes according to the process of this invention. However, as is obvious to those skilled in the art, compounds such as maleic acid or other equivalent compounds may be substituted for maleic anhydride in the practice of this invention.

The comonomer reactants can be employed in equimolar amounts or an excess of one reactant or other can be used. When operating in this manner, copolymers whose compositions range from about 40 to about 60 mole percent of either monomer can be prepared. However, copolymers comprising 50 mole percent of each of the monomers are the preferred products of this invention. Such copolymers generally exhibit melting points in excess of 200° C. and usually in the range of about 220 to about 240° C. The molecular weights of these copolymers usually range up to about 70,000, as measured by an ebullioscopic method.

In practicing this invention the specified monomers can be copolymerized in the presence of a catalyst although excellent results are obtained in the absence of catalysts. Suitable catalysts which can be employed are benzoyl peroxide, azo bisisobutyronitrile and diisopropyl peroxydicarbonate. However, such catalysts do not appreciably enhance the polymerization reaction. Furthermore, certain prior art catalysts, for example, a Lewis Acid such as boron trifluoride, may actually inhibit the formation of copolymer. Therefore, it is preferred to practice the process of this invention in the absence of a catalyst.

Reaction temperatures in the range of about 30 to about 150° C. are generally employed in the practice of this invention. The preferred temperatures are generally those up to about 100° C. and most preferably in the range of about 50 to about 80° C., although under some circumstances, lower or higher temperatures may be preferred. Under such conditions the polymerization reaction will generally be complete in periods of not more than 15 hours and usually within a period of about 6 to about 15 hours. The 1,1,4,4-tetraalkyl-1,3-butadiene maleic anhydride copolymers can be removed from the reaction mixture by any of the conventional means known in the prior art to be suitable for this purpose. For example, a non-solvent can be added to the reaction mixture to precipitate the copolymer which is then isolated. This is in sharp contrast to copolymers prepared in heterogeneous systems which copolymers must be first dissolved in a suitable solvent and then isolated and purified.

The copolymerization process of this invention is not particularly dependent on any specific pressure conditions and, therefore, atmospheric, elevated or reduced pressures can be employed. The pressure employed, if any, is usually only sufficient to maintain the reaction mixture in solution. The reaction solvent employed in the practice of this invention is subject to wide variation. However, the reagent employed must be such that it is inert and a solvent for the resulting copolymer at the temperature of reaction. The inert liquids employed are also solvents for the maleic anhydride which is a solid. Amounts of solvent in the range of about 1.5 to about 8 ml. of solvent, and preferably about 2 to about 8 ml. of solvent per gram of maleic anhydride will give satisfactory results. Although dimethyl formamide, acetone, cyclohexanone and methylethyl ketone, for example, are particularly effective solvents for the practice of this invention, any inert organic liquid, or mixture thereof, which is a solvent for the 1,1,4,4-tetraalkyl-1,3-butadiene maleic anhydride copolymer at the polymerization temperature can be employed. By merely refluxing the two monomers in such a solvent at atmospheric pressure, it is possible to obtain 1,1,4,4-tetraalkyl-1,3-butadiene maleic anhydride copolymers in solution which solution may be used directly for casting surface coatings that are water resistant.

This invention can be further illustrated by the following examples of preferred embodiments thereof although it will be understood that these examples are included merely for purposes of illustration and are not intended to limit the scope of the invention unless otherwise specifically indicated.

*Example 1*

To a 1-liter, single neck flask equipped with a reflux condenser is charged 99 g. (1 mole) of maleic anhydride, 300 ml. of acetone and 110 g. (1 mole) of 1,1,4,4-tetramethyl-1,3-butadiene. The mixture is heated at reflux for about 14 hours. A yellow viscous solution is obtained and treated with methanol which causes the copolymer to precipitate. The solid material obtained is slurried twice with methanol and filtered after each slurry. The resulting polymer is dried at 105° C. in a vacuum oven. There is obtained 71 g. of snow-white 1,1,4,4-tetramethyl-1,3-butadiene maleic anhydride copolymer having a melting point in the range of 220 to 240° C. and a Vicat softening point of 138.5° C. When compressed at 190° C., a sample of this copolymer gives a very transparent button.

Similar results are obtained when 1,1,4,4-tetraethyl or tetrabutyl-1,3-butadiene is substituted for 1,1,4,4-tetramethyl-1,3-butadiene in the above procedure.

*Example 2*

To a 1-liter, single neck flask equipped with a reflux condener is charged 99 g. (1 mole) of maleic anhydride, 300 ml. of dimethyl formamide and 110 g. (1 mole) of 1,1,4,4-tetramethyl-1,3-butadiene. The mixture is heated at reflux for about 14 hours and the solution poured into 1000 ml. of 10% acetic acid in water and filtered to remove the copolymer. The copolymer is slurried twice in methanol filtering after each slurry. The polymer is dried at 105° C. in a vacuum oven. There is obtained 120 g. of 1,1,4,4-tetramethyl-1,3-butadiene maleic anhydride copolymer powder.

Similar results are obtained when cyclohexanone or methylethyl ketone are employed as the solvent to prepare copolymers using the above procedure.

Thus, this invention provides the art with a simple, direct and economically feasible process for preparing 1,1,4,4-tetraalkyl-1,3-butadiene maleic anhydride copolymers. The copolymers prepared according to the process of this invention have excellent thermal stability, good hydrolytic stability and may be spun into fibers having good flexibility by conventional methods. Furthermore, articles which are compression molded from the copolymers prepared according to the process of this invention exhibit excellent transparency. In addition, the 1,1,4,4-tetraalkyl-1,3-butadiene maleic anhydride copolymers prepared according to the process of this invention are characterized by high stiffness, high hardness and high melting range rather than the rubber-like properties generally associated with diene copolymers of this type.

Although the invention has been described in considerable detail with reference to certain preferred embodiments thereof, it will be understood that variations and modifications can be effected without departing from the spirit and scope of the invention as described hereinabove and as defined in the appended claims.

We claim:

1. A process for preparing 1,1,4,4-tetraalkyl-1,3-butadiene maleic anhydride copolymer in a homogeneous system which comprises copolymerizing a 1,1,4,4-tetraalkyl-1,3-butadiene with maleic anhydride at a temperature in the range of about 30 to about 150° C. in an inert organic liquid solvent selected from the group consisting of dimethyl formamide, acetone, cyclohexanone and methylethyl ketone.

2. A process for preparing 1,1,4,4-tetraalkyl-1,3-butadiene maleic anhydride copolymer in a homogeneous system which comprises copolymerizing a 1,1,4,4-tetraalkyl-1,3-butadiene with maleic anhydride at a temperature in the range of about 50 to about 100° C. in an inert organic liquid solvent selected from the group consisting of dimethyl formamide, acetone, cyclohexanone and methylethyl ketone.

3. A process for preparing 1,1,4,4-tetraalkyl-1,3-butadiene maleic anhydride copolymer in a homogeneous system which comprises copolymerizing a 1,1,4,4-tetra lower alkyl-1,3-butadiene with maleic anhydride at a temperature in the range of about 50 to about 100° C. in an inert organic liquid solvent selected from the group consisting of dimethyl formamide, acetone, cyclohexanone and methylethyl ketone.

4. A process for preparing 1,1,4,4-tetraalkyl-1,3-butadiene maleic anhydride copolymer in a homogeneous system which comprises copolymerizing a 1,1,4,4-tetra lower alkyl-1,3-butadiene with maleic anhydride at a temperature in the range of about 50 to about 100° C. in dimethyl formamide.

5. A process for preparing 1,1,4,4-tetraalkyl-1,3-butadiene maleic anhydride copolymer in a homogeneous system which comprises copolymerizing a 1,1,4,4-tetra lower alkyl-1,3-butadiene with maleic anhydride at a temperature in the range of about 50 to about 100° C. in acetone.

6. A process for preparing 1,1,4,4-tetramethyl-1,3-butadiene maleic anhydride copolymer in a homogeneous system which comprises copolymerizing 1,1,4,4-tetramethyl-1,3-butadiene with maleic anhydride at a temperature in the range of about 50 to about 100° C. in an inert organic liquid solvent selected from the group consisting of dimethyl formamide, acetone, cyclohexanone and methylethyl ketone.

7. A process for preparing 1,1,4,4-tetramethyl-1,3-butadiene maleic anhydride copolymer in a homogeneous system which comprises copolymerizing 1,1,4,4-tetramethyl-1,3-butadiene with maleic anhydride at a temperature in the range of about 50 to about 80° C. in an inert organic liquid solvent selected from the group consisting of dimethyl formamide, acetone, cyclohexanone and methylethyl ketone.

8. A process for preparing 1,1,4,4-tetramethyl-1,3-butadiene maleic anhydride copolymer which comprises refluxing 1,1,4,4-tetramethyl-1,3-butadiene with maleic anhydride in dimethyl formamide.

9. A process for preparing 1,1,4,4-tetramethyl-1,3-butadiene maleic anhydride copolymer which comprises refluxing 1,1,4,4-tetramethyl-1,3-butadiene with maleic anhydride in acetone.

References Cited by the Examiner
UNITED STATES PATENTS
2,810,716  10/1957  Markus _____ 260—78.5

OTHER REFERENCES
Schildknecht: "Vinyl and Related Polymers," T. P. 98CV48 S3, 1959, p. 706 relied on.

JOSEPH L. SCHOFER, *Primary Examiner.*
DONALD E. CZAJA, *Examiner.*
L. WOLF, *Assistant Examiner.*